(12) United States Patent
Togashi

(10) Patent No.: US 7,265,964 B1
(45) Date of Patent: Sep. 4, 2007

(54) MULTILAYER FEEDTHROUGH CAPACITOR ARRAY

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/598,055

(22) Filed: Nov. 13, 2006

(30) Foreign Application Priority Data

Jan. 17, 2006 (JP) .............................. 2006-008960

(51) Int. Cl.
*H01G 4/005* (2006.01)
*H01G 4/228* (2006.01)

(52) U.S. Cl. ....................... 361/303; 361/309; 361/329

(58) Field of Classification Search ............. 361/301.2, 361/301.4, 303, 306.1, 306.2, 306.3, 309, 361/328–329
See application file for complete search history.

(56) References Cited

U.S. PATENT DOCUMENTS

| | | | | | |
|---|---|---|---|---|---|
| 4,831,494 | A | * | 5/1989 | Arnold et al. | 361/306.3 |
| 7,046,500 | B2 | * | 5/2006 | Lee et al. | 361/303 |
| 7,145,429 | B1 | * | 12/2006 | Togashi et al. | 336/200 |
| 2004/0125540 | A1 | * | 7/2004 | Vieweg et al. | 361/306.3 |
| 2004/0179325 | A1 | * | 9/2004 | Togashi et al. | 361/306.3 |
| 2006/0007634 | A1 | * | 1/2006 | Togashi et al. | 361/306.3 |

FOREIGN PATENT DOCUMENTS

JP      A 11-97291      4/1999

* cited by examiner

*Primary Examiner*—Eric Thomas
(74) *Attorney, Agent, or Firm*—Oliff & Berridge, PLC

(57) ABSTRACT

A multilayer feedthrough capacitor array is provided with a capacitor element, and first to sixth terminal electrodes. The capacitor element has a plurality of laminated insulator layers, a first signal internal electrode and a first ground internal electrode disposed so as to face each other with the insulator layer in between, and a second signal internal electrode and a second ground internal electrode disposed so as to face each other with the insulator layer in between. The first signal internal electrode includes a first signal lead portion electrically and physically connected to the first terminal electrode, and a second signal lead portion electrically and physically connected to the second terminal electrode. The first ground internal electrode includes a first ground lead portion electrically and physically connected to the fifth terminal electrode, and a second ground lead portion electrically and physically connected to the sixth terminal electrode. The second signal internal electrode includes a third signal lead portion electrically and physically connected to the third terminal electrode, and a fourth signal lead portion electrically and physically connected to the fourth terminal electrode. The second ground internal electrode includes a third ground lead portion electrically and physically connected to the fifth terminal electrode, and a fourth ground lead portion electrically and physically connected to the sixth terminal electrode. The first signal internal electrode and the second ground internal electrode are disposed so as not to face each other with the insulator layer in between, and the second signal internal electrode and the first ground internal electrode are disposed so as not to face each other with the insulator layer in between.

18 Claims, 16 Drawing Sheets

(a)

(b)

(a)

(b)

(a)

(b)

(a)

(b)

(a)

(b)

(a)

(b)

MULTILAYER FEEDTHROUGH CAPACITOR ARRAY

BACKGROUND OF THE INVENTION

1. Field of the Invention

The present invention relates to a multilayer feedthrough capacitor array.

2. Related Background Art

A known multilayer feedthrough capacitor array of this type is a capacitor array in which a plurality of signal internal electrodes and a plurality of ground internal electrodes are laminated through insulator layers to form a plurality of capacitors along the laminate direction (e.g., cf. Japanese Patent Application Laid-Open No. 11-97291). In such a multilayer feedthrough capacitor array, the plurality of ground internal electrodes are connected to one terminal electrode, and connected to the ground via the terminal electrode.

SUMMARY OF THE INVENTION

However, there exists a problem of occurrence of crosstalk in the multilayer feedthrough capacitor array described in the Laid-Open No. 11-97291.

In the multilayer feedthrough capacitor array described in the Laid-Open No. 11-97291, two signal internal electrodes are disposed with a ground internal electrode in between, and thus the ground internal electrode is common to two different capacitors. For this reason, the ground internal electrode acts as a common impedance to the two different capacitors, and electric currents flowing in the two different capacitors flow through the common impedance. This results in causing common impedance coupling.

When the common impedance coupling occurs between two different capacitors as described above, the ground potential due to the electric current flowing in one capacitor is affected by the ground potential due to the electric current flowing in the other capacitor. Namely, the ground potential due to the electric current flowing in one capacitor varies depending upon the electric current flowing from the other capacitor to the common impedance. This variation of the ground potential becomes noise to cause crosstalk.

An object of the present invention is to provide a multilayer feedthrough capacitor array capable of suppressing occurrence of crosstalk.

A multilayer feedthrough capacitor array according to the present invention is a multilayer feedthrough capacitor array comprising a capacitor element, and first to sixth terminal electrodes formed on outer surfaces of the capacitor element, wherein the capacitor element has a plurality of laminated insulator layers, a first signal internal electrode and a first ground internal electrode disposed so as to face each other with at least one the insulator layer in between, and a second signal internal electrode and a second ground internal electrode disposed so as to face each other with at least one the insulator layer in between, wherein the first signal internal electrode comprises first and second signal lead portions led to the outer surfaces, and the first and second signal lead portions are electrically connected to the first and second terminal electrodes, respectively, wherein the first ground internal electrode comprises first and second ground lead portions led to the outer surfaces, and the first and second ground lead portions are electrically connected to the fifth and sixth terminal electrodes, respectively, wherein the second signal internal electrode comprises third and fourth signal lead portions led to the outer surfaces, and the third and fourth signal lead portions are electrically connected to the third and fourth terminal electrodes, respectively, wherein the second ground internal electrode comprises third and fourth ground lead portions led to the outer surfaces, and the third and fourth ground lead portions are electrically connected to the fifth and sixth terminal electrodes, respectively, and wherein the first signal internal electrode and the second ground internal electrode are disposed so as not to face each other with the insulator layer in between, and the second signal internal electrode and the first ground internal electrode are disposed so as not to face each other with the insulator layer in between.

The multilayer feedthrough capacitor array according to the present invention comprises the first ground internal electrode disposed so as to face the first signal internal electrode with at least one the insulator layer in between, and the second ground internal electrode disposed so as to face the second signal internal electrode with at least one the insulator layer in between, the first signal internal electrode and the second ground internal electrode are disposed so as not to face each other with the insulator layer in between, and the second signal internal electrode and the first ground internal electrode are disposed so as not to face each other with the insulator layer in between. Therefore, the first and second ground internal electrodes do not act as a common impedance, and no common impedance coupling occurs between a capacitor constructed of the first signal internal electrode and the first ground internal electrode, and a capacitor constructed of the second signal internal electrode and the second ground internal electrode. As a result, occurrence of crosstalk can be suppressed between the foregoing capacitors.

Incidentally, the first ground internal electrode and the second ground internal electrode are electrically connected through the fifth and sixth terminal electrodes. Since the impedance of the fifth and sixth terminal electrodes is much smaller than the impedance of the first and second ground internal electrodes, a possibility of occurrence of common impedance coupling is extremely low.

Preferably, the first signal internal electrode and the second ground internal electrode are disposed in one plane. In this case, the number of layers for the internal electrodes is reduced and it can achieve a lower profile of the capacitor element.

Preferably, the second ground internal electrode is formed so that a marginal portion thereof facing the first signal internal electrode is cut off, and the first signal internal electrode comprises a projection portion extending toward a region formed so as to be cut off in the second ground internal electrode. In this case, the area of the first signal internal electrode can be set to a relatively large value, and it can increase the capacitance.

Preferably, the second signal internal electrode and the first ground internal electrode are disposed in one plane. In this case, the number of layers for the internal electrodes is reduced and it can achieve a lower profile of the capacitor element.

Preferably, the first ground internal electrode is formed so that a marginal portion thereof facing the second signal internal electrode is cut off, and the second signal internal electrode comprises a projection portion extending toward a region formed so as to be cut off in the first ground internal electrode. In this case, the area of the second signal internal electrode can be set to a relatively large value, and it can increase the capacitance.

Preferably, the first signal internal electrode and the second signal internal electrode comprise respective portions facing each other with the insulator layer in between. In this case, a new capacitor (so called a general capacitor) is constructed of the first signal internal electrode and the second signal internal electrode, and it enables a complex structure of the multilayer feedthrough capacitor array and the general capacitor.

Preferably, the capacitor array further comprises seventh and eighth terminal electrodes, the first ground internal electrode further comprises fifth and sixth ground lead portions led to the outer surfaces, the fifth and sixth ground lead portions are electrically connected to the seventh and eighth terminal electrodes, respectively, the second ground internal electrode comprises seventh and eighth ground lead portions led to the outer surfaces, and the seventh and eighth ground lead portions are electrically connected to the seventh and eighth terminal electrodes, respectively. In this case, the capacitor array can be realized as a multilayer feedthrough capacitor array capable of handling a large electric current.

The present invention successfully provides the multilayer feedthrough capacitor array capable of suppressing occurrence of crosstalk.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description identical elements or elements with identical functionality will be denoted by the same reference symbols, without redundant description.

First Embodiment

Figure 1:
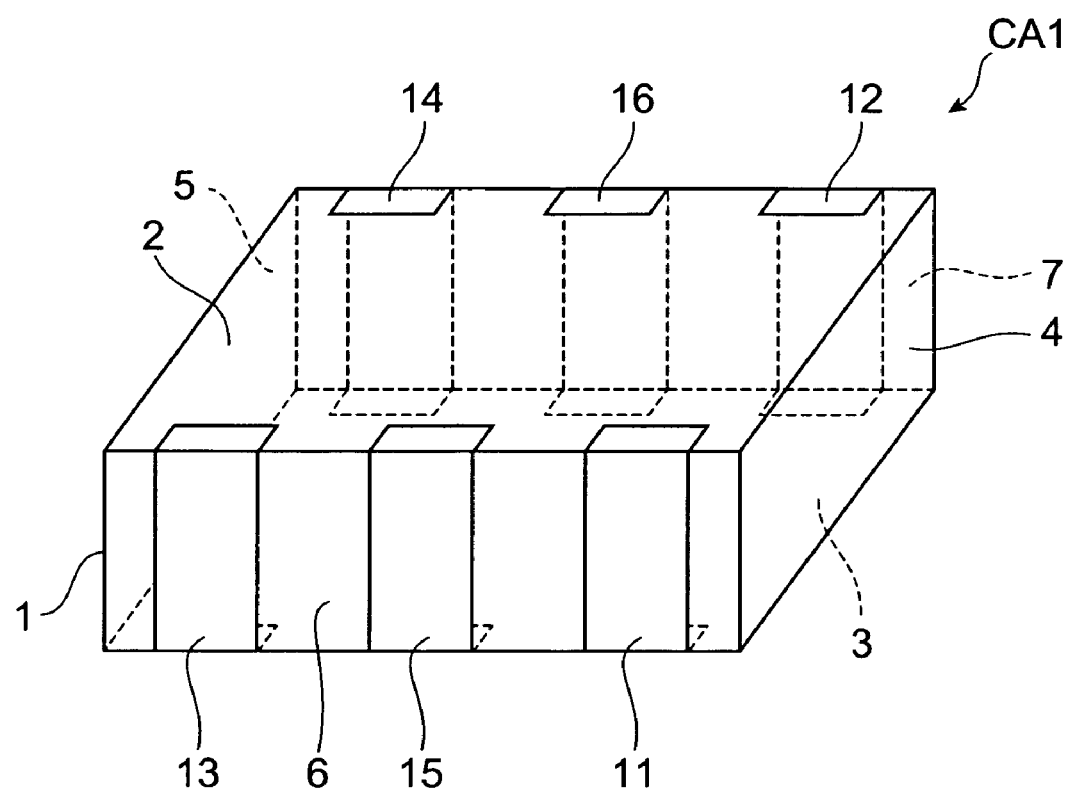
FIG. 1 is a perspective view of a multilayer feedthrough capacitor array according to the first embodiment.
Figure 2:
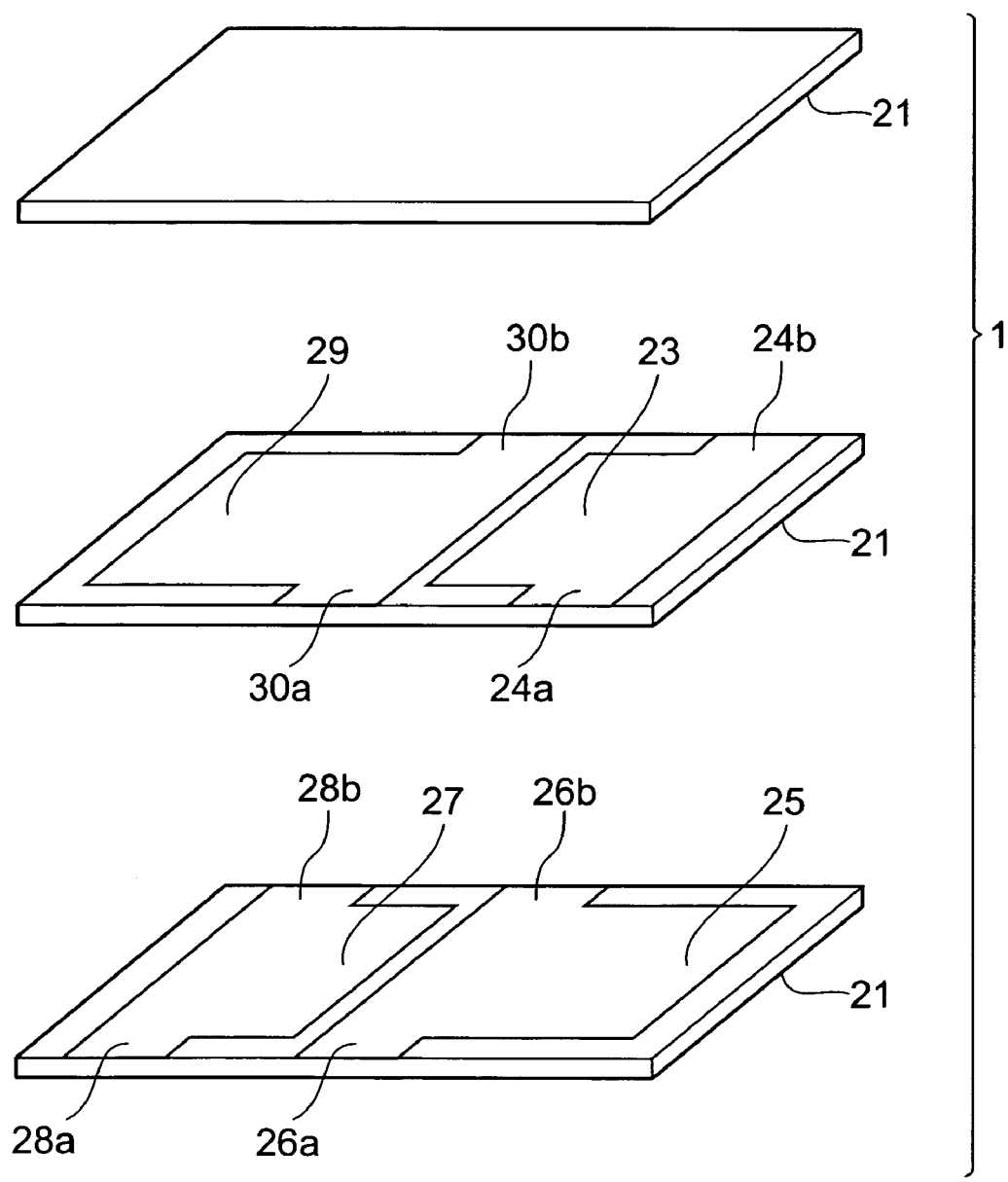
FIG. 2 is an exploded perspective view of a capacitor element in the multilayer feedthrough capacitor array according to the first embodiment.
Figure 3:
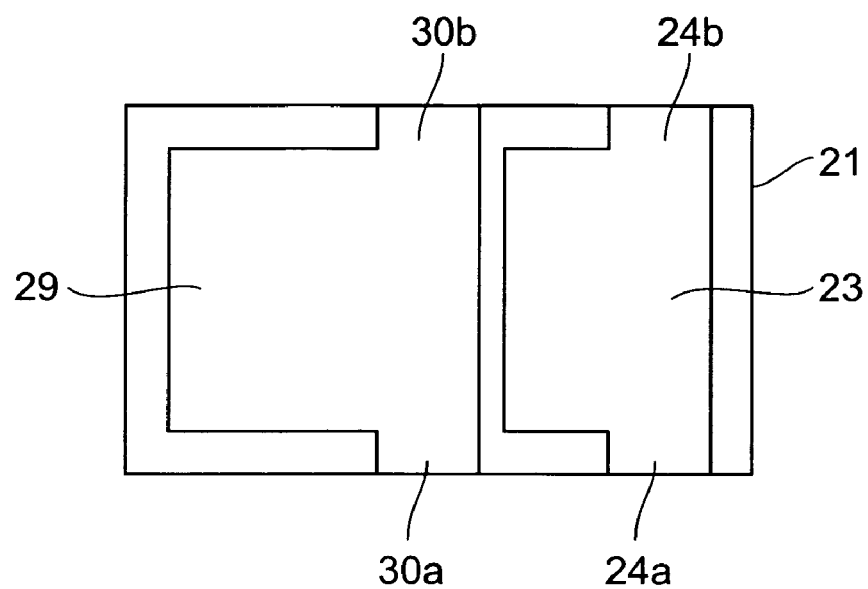
FIG. 3 is schematic views showing shapes of internal electrodes.
Figure 3:
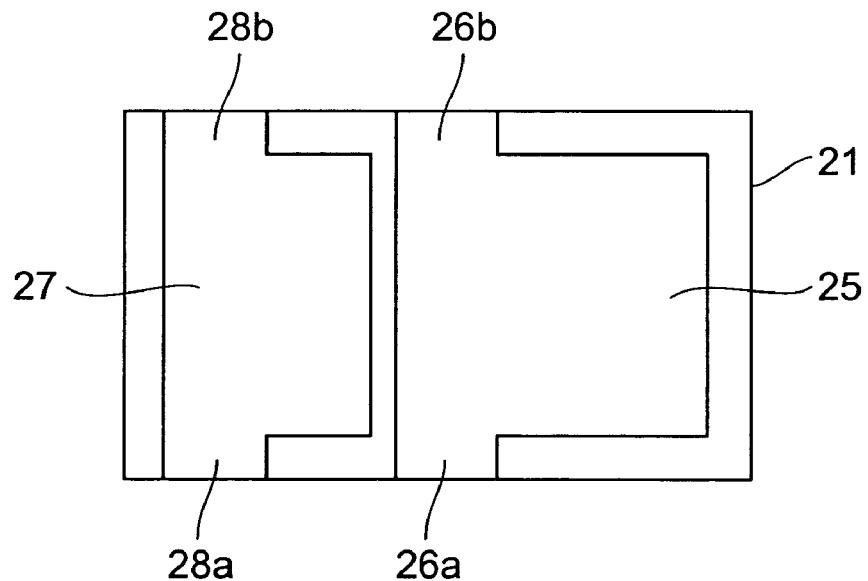

A configuration of a multilayer feedthrough capacitor array CA1 according to the first embodiment will be described with reference to FIGS. 1 to 3. FIG. 1 is a perspective view of the multilayer feedthrough capacitor array according to the first embodiment. FIG. 2 is an exploded perspective view of a capacitor element in the multilayer feedthrough capacitor array according to the first embodiment. FIG. 3 is schematic views showing shapes of internal electrodes.

The multilayer feedthrough capacitor array CA1, as shown in FIG. 1, is provided with a capacitor element 1 of approximately rectangular parallelepiped shape, and first to sixth terminal electrodes 11-16 disposed on outer surfaces of the capacitor element 1. The capacitor element 1 includes first and second principal surfaces 2, 3 facing each other, first and second end surfaces 4, 5 facing each other, and first and second side surfaces 6, 7 facing each other. The first and second end surfaces 4, 5 and the first and second side surfaces 6, 7 extend so as to connect the first principal surface 2 and the second principal surface 3.

The first terminal electrode 11, the third terminal electrode 13, and the fifth terminal electrode 15 are disposed on the first side surface 6 of the capacitor element 1. The first terminal electrode 11 and the third terminal electrode 13 are located in the marginal regions of the first side surface 6. The fifth terminal electrode 15 is located in the central region of the first side surface 6. The second terminal electrode 12, the fourth terminal electrode 14, and the sixth terminal electrode 16 are disposed on the second side surface 7 of the capacitor element 1. The second terminal electrode 12 and the fourth terminal electrode 14 are located in the marginal regions of the second side surface 7. The sixth terminal electrode 16 is located in the central region of the second side surface 7. The first to fourth terminal electrodes 11-14 function as signal terminal electrodes, and the fifth and sixth terminal electrodes 15, 16 as ground terminal electrodes.

The first to sixth terminal electrodes 11-16 are formed, for example, by applying an electroconductive paste containing electroconductive metal powder and glass frit, onto the outer surfaces of the capacitor element 1 and baking it. A plated layer is formed on the baked electrodes in certain cases as occasion may demand.

The capacitor element 1 has a plurality of laminated insulator layers 21, a first signal internal electrode 23 and a first ground internal electrode 25, and a second signal internal electrode 27 and a second ground internal electrode 29. Each insulator layer 21 extends in parallel with the first and second principal surfaces 2, 3. In the capacitor element 1, the direction in which the first principal surface 2 faces the second principal surface 3, is a laminate direction of the plurality of insulator layers 21. The first signal internal electrode 23 and the first ground internal electrode 25 are disposed so as to face each other with the insulator layer 21 in between. The second signal internal electrode 27 and the second ground internal electrode 29 are disposed so as to face each other with the insulator layer 21 in between.

Each insulator layer 21 is constructed, for example, of a sintered body of a ceramic green sheet containing a dielectric ceramic. In practical multilayer feedthrough capacitor array CA1, the insulator layers 21 are integrally formed so that no border can be visually recognized between the insulator layers 21. Each of the internal electrodes 23-29 is constructed of a sintered body of an electroconductive paste. The first and second signal internal electrodes 23, 27 constitute feedthrough conductors in the multilayer feedthrough capacitor array CA1.

The first signal internal electrode 23 is disposed in the same plane as the second ground internal electrode 29 is, as shown in (a) in FIG. 3. Namely, the first signal internal electrode 23 and the second ground internal electrode 29 are located on the same insulator layer 21. The first signal internal electrode 23 and the second ground internal electrode 29 are placed alongside in a direction in which the first end surface 4 and the second end surface 5 face each other, while being spaced with a predetermined spacing. The first signal internal electrode 23 and the second ground internal electrode 29 are electrically isolated from each other. Since the first signal internal electrode 23 and the second ground internal electrode 29 are disposed in the same plane, they are disposed so as not to face each other with the insulator layer 21 in between.

The second signal internal electrode 27 is disposed in the same plane as the first ground internal electrode 25 is, as shown in (b) in FIG. 3. Namely, the second signal internal electrode 27 and the first ground internal electrode 25 are located on the insulator layer 21 different from the insulator layer 21 on which the first signal internal electrode 23 and the second ground internal electrode 29 are located. The second signal internal electrode 27 and the first ground internal electrode 25 are placed alongside in the direction in which the first end surface 4 and the second end surface 5 face each other, while being spaced with a predetermined spacing. The second signal internal electrode 27 and the first ground internal electrode 25 are electrically isolated from each other. Since the second signal internal electrode 27 and the first ground internal electrode 25 are placed in the same plane, they are disposed so as not to face each other with the insulator layer 21 in between.

The first signal internal electrode 23 includes a first signal lead portion 24a led to the first side surface 6, and a second signal lead portion 24b led to the second side surface 7. The first signal internal electrode 23 penetrates the capacitor element 1 from the first side surface 6 to the second side surface 7.

The first signal lead portion 24a is electrically and physically connected to the first terminal electrode 11. The second signal lead portion 24b is electrically and physically connected to the second terminal electrode 12. These connections result in electrically connecting the first signal internal electrode 23 to the first terminal electrode 11 and to the second terminal electrode 12.

The first ground internal electrode 25 includes a first ground lead portion 26a led to the first side surface 6, and a second ground lead portion 26b led to the second side surface 7. The first ground internal electrode 25 penetrates the capacitor element 1 from the first side surface 6 to the second side surface 7.

The first ground lead portion 26a is electrically and physically connected to the fifth terminal electrode 15. The second ground lead portion 26b is electrically and physically connected to the sixth terminal electrode 16. These connections result in electrically connecting the first ground internal electrode 25 to the fifth terminal electrode 15 and to the sixth terminal electrode 16.

The second signal internal electrode 27 includes a third signal lead portion 28a led to the first side surface 6, and a fourth signal lead portion 28b led to the second side surface 7. The second signal internal electrode 27 penetrates the capacitor element 1 from the first side surface 6 to the second side surface 7.

The third signal lead portion 28a is electrically and physically connected to the third terminal electrode 13. The fourth signal lead portion 28b is electrically and physically connected to the fourth terminal electrode 14. These connections result in electrically connecting the second signal internal electrode 27 to the third terminal electrode 13 and to the fourth terminal electrode 14.

The second ground internal electrode 29 includes a third ground lead portion 30a led to the first side surface 6, and a fourth ground lead portion 30b led to the second side surface 7. The second ground internal electrode 29 penetrates the capacitor element 1 from the first side surface 6 to the second side surface 7.

The third ground lead portion 30a is electrically and physically connected to the fifth terminal electrode 15. The fourth ground lead portion 30b is electrically and physically connected to the sixth terminal electrode 16. These connections result in electrically connecting the second ground internal electrode 29 to the fifth terminal electrode 15 and to the sixth terminal electrode 16. The first ground internal electrode 25 and the second ground internal electrode 29 are electrically connected through the fifth terminal electrode 15 and the sixth terminal electrode 16.

Figure 4:
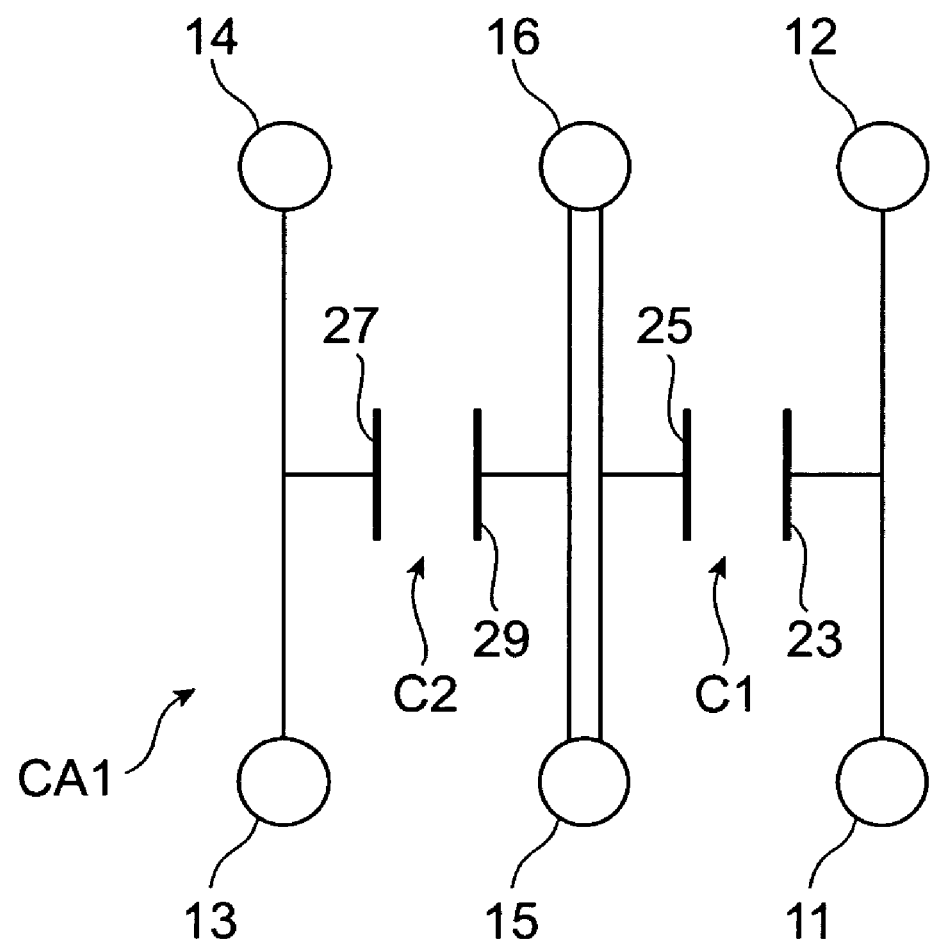
FIG. 4 is an equivalent circuit diagram of the multilayer feedthrough capacitor array according to the first embodiment.

In the multilayer feedthrough capacitor array CA1 constructed as described above, a pair of capacitors C1, C2 are formed, as shown in FIG. 4. FIG. 4 is an equivalent circuit diagram of the multilayer feedthrough capacitor array according to the first embodiment. The capacitor C1 is constructed of the first signal internal electrode 23 and the first ground internal electrode 25. The capacitor C2 is constructed of the second signal internal electrode 27 and the second ground internal electrode 29.

In the first embodiment, as described above, the multilayer feedthrough capacitor array CA1 is provided with the first signal internal electrode 23 and the first ground internal electrode 25 facing each other, and the second signal internal electrode 27 and the second ground internal electrode 29 facing each other. Since the first signal internal electrode 23 and the second ground internal electrode 29 are disposed so as not to face each other with the insulator layer 21 in between, no electric current flows from the first signal internal electrode 23 to the second ground internal electrode 29. Since the second signal internal electrode 27 and the first ground internal electrode 25 are disposed so as not to face each other with the insulator layer 21 in between, no electric current flows from the second signal internal electrode 27 to the first ground internal electrode 25. For these reasons, the first and second ground internal electrodes 25, 29 do not act as a common impedance, and thus no common impedance coupling occurs between the capacitor C1 and the capacitor C2. As a result, it is feasible to suppress the occurrence of crosstalk between the aforementioned capacitors C1, C2.

Incidentally, the impedance of the fifth and sixth terminal electrodes 15, 16 is much smaller than that of the first and second ground internal electrodes 25, 29. Therefore, the possibility of occurrence of common impedance coupling is extremely low even if the first ground internal electrode 25 and the second ground internal electrode 29 are electrically connected through the fifth and sixth terminal electrodes 15, 16.

In the first embodiment the first signal internal electrode 23 and the second ground internal electrode 29 are disposed in the same plane. This decreases the number of layers where the internal electrodes 23, 25, 27, 29 are disposed, and it can achieve a lower profile of the capacitor element 1.

In the first embodiment the second signal internal electrode 27 and the first ground internal electrode 25 are also disposed in the same plane. This further decreases the number of layers where the internal electrodes 23, 25, 27, 29 are disposed, and it can achieve a much lower profile of the capacitor element 1.

Figure 5:
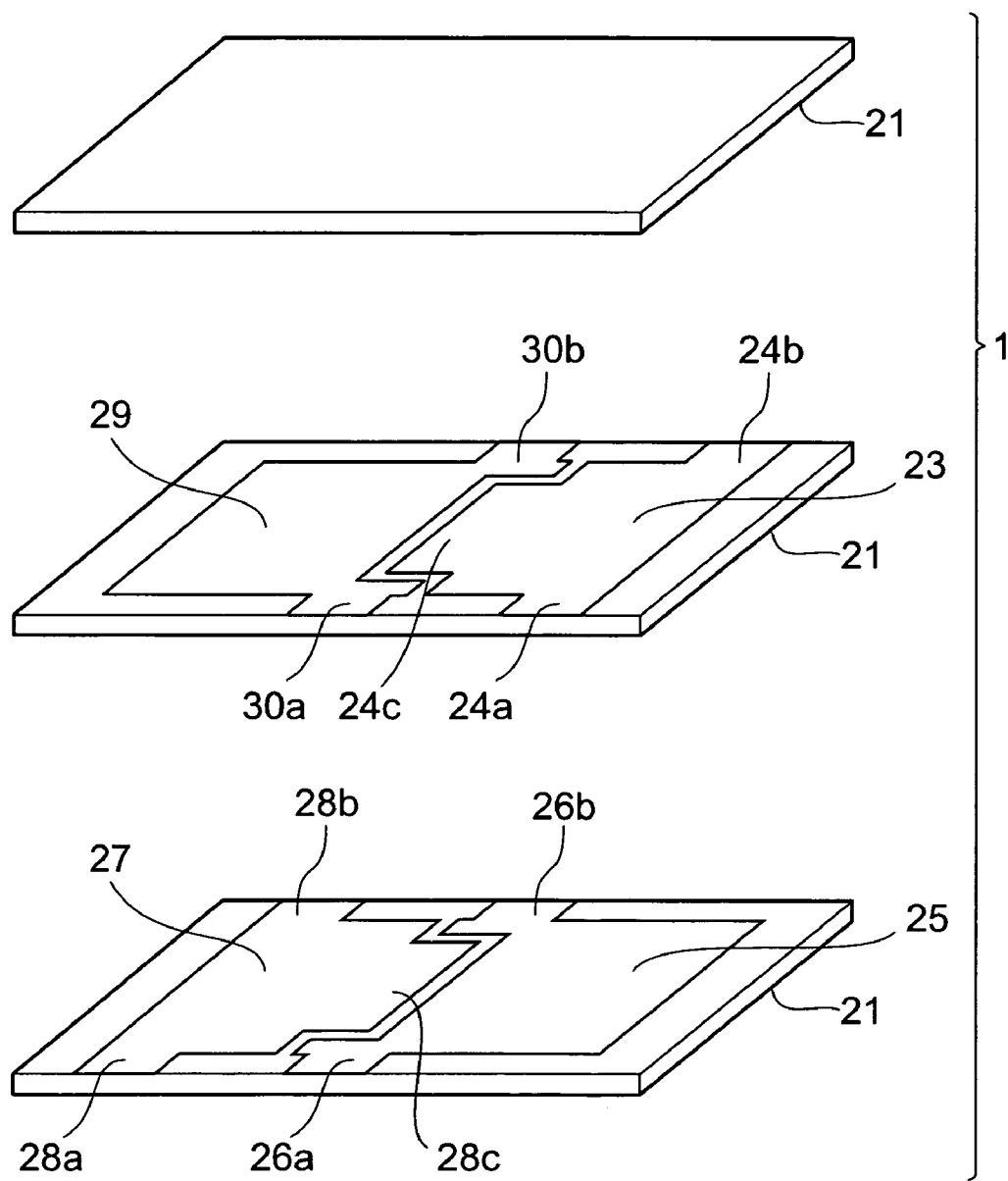
FIG. 5 is an exploded perspective view of a capacitor element in a modification example of the multilayer feedthrough capacitor array according to the first embodiment.
Figure 6:
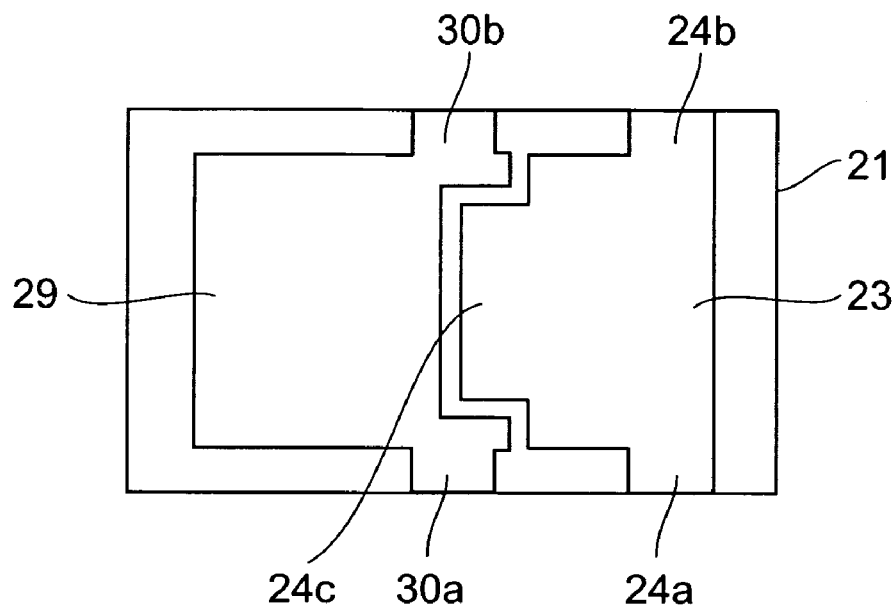
FIG. 6 is schematic views showing shapes of internal electrodes.
Figure 6:
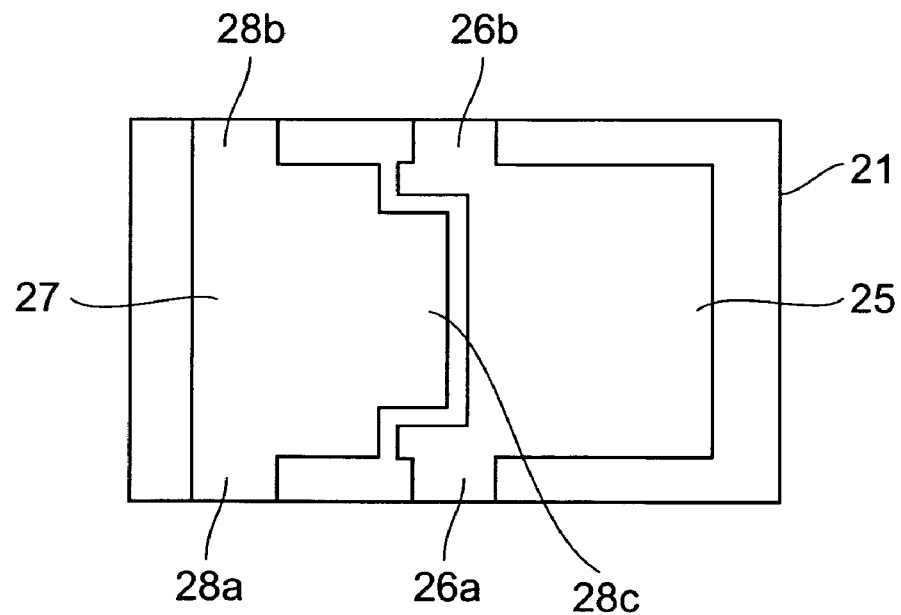

A configuration of a modification example of the multilayer feedthrough capacitor array CA1 according to the first embodiment will be described below with reference to FIGS. 5 and 6. FIG. 5 is an exploded perspective view of a capacitor element in the modification example of the multilayer feedthrough capacitor array of the first embodiment. FIG. 6 is schematic views showing shapes of internal electrodes. The multilayer feedthrough capacitor array of the modification example shown in FIG. 5 is different in the shapes of the respective internal electrodes 23, 25, 27, 29 from the multilayer feedthrough capacitor array CA1 of the first embodiment described above.

The second ground internal electrode 29, as shown in FIG. 5 and in (a) in FIG. 6, is formed so that a marginal portion thereof facing the first signal internal electrode 23 is cut off. The first signal internal electrode 23 includes a projection portion 24c extending toward a region formed so as to be cut off in the second ground internal electrode 29. The first ground internal electrode 25 is formed so that a marginal portion thereof facing the second signal internal electrode 27 is cut off. The second signal internal electrode 27, as shown in FIG. 5 and in (b) in FIG. 6, includes a projection portion 28c extending toward a region formed so as to be cut off in the first ground internal electrode 25. For these reasons, the area of the first signal internal electrode 23 and the second signal internal electrode 27 can be set to a relatively large value, and it can increase the capacitance of the capacitors C1, C2.

Figure 7:
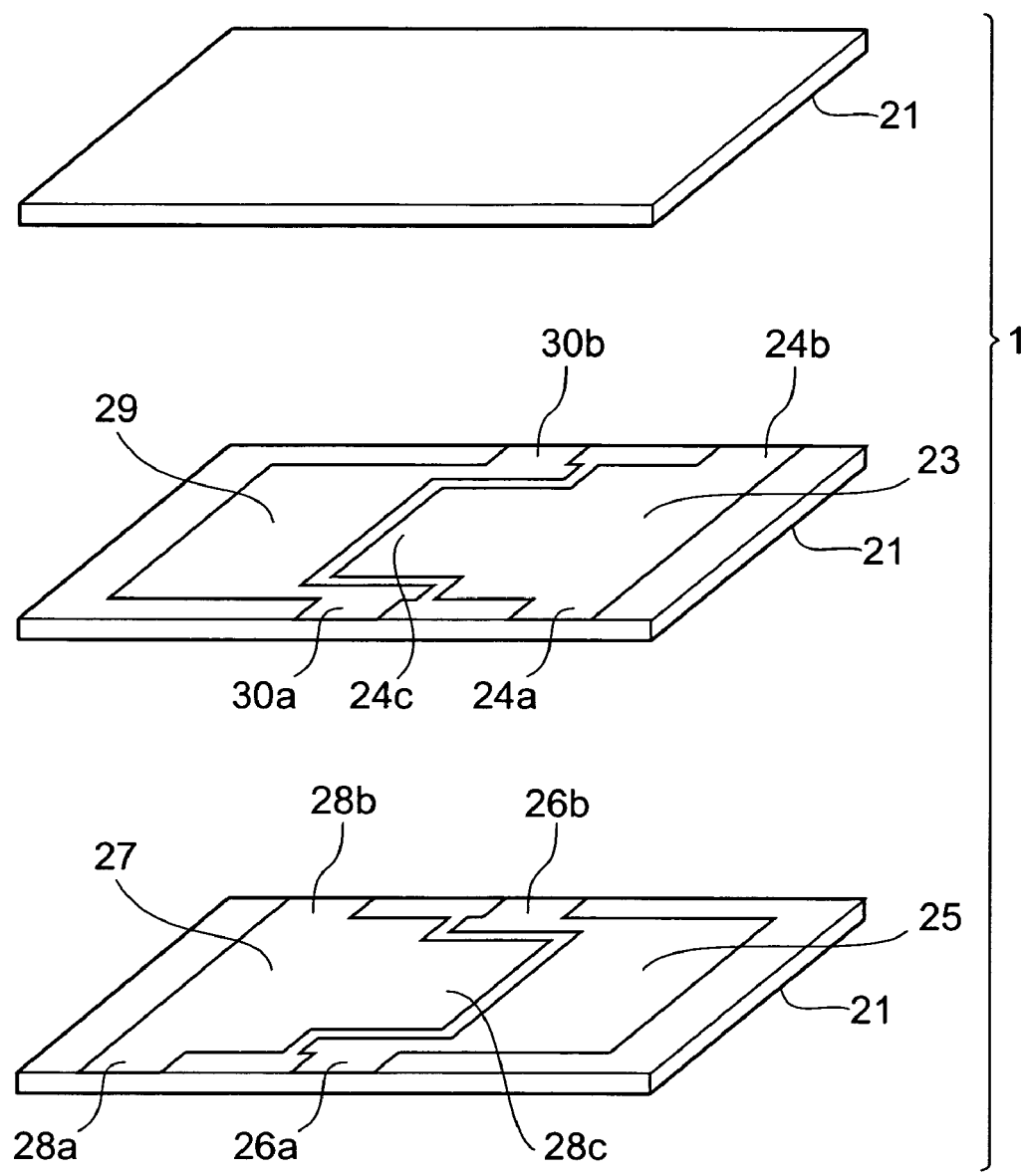
FIG. 7 is an exploded perspective view of a capacitor element in another modification example of the multilayer feedthrough capacitor array according to the first embodiment.
Figure 8:
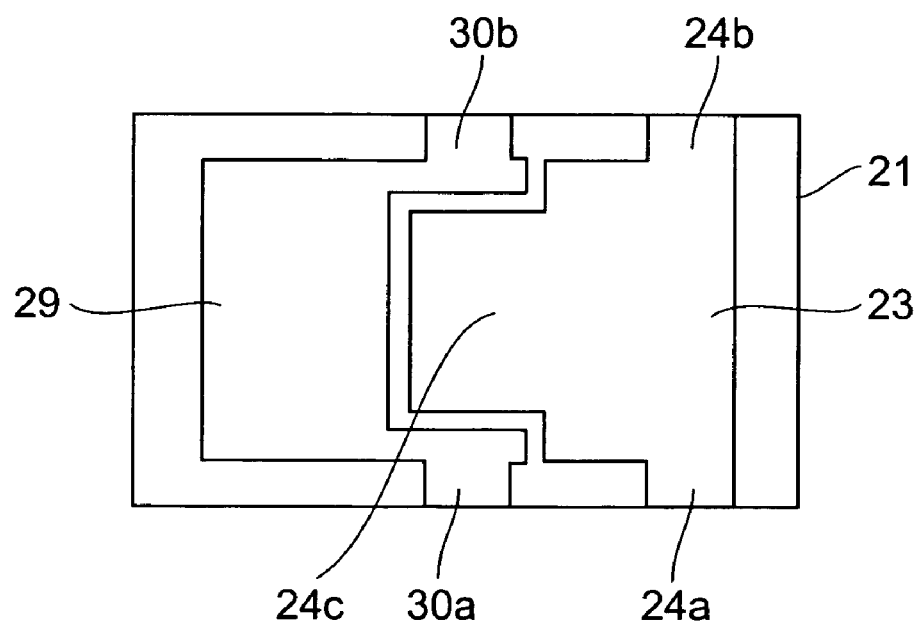
FIG. 8 is schematic views showing shapes of internal electrodes.
Figure 8:
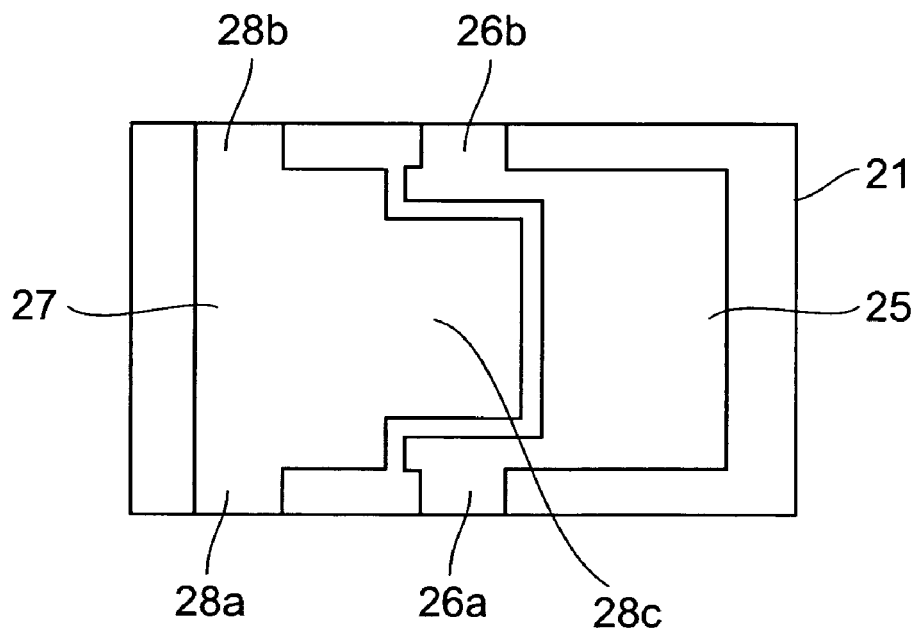

A configuration of a further modification example of the multilayer feedthrough capacitor array CA1 according to the first embodiment will be described below with reference to FIGS. 7 and 8. FIG. 7 is an exploded perspective view of a capacitor element in the modification example of the multilayer feedthrough capacitor array of the first embodiment. FIG. 8 is schematic views showing shapes of internal electrodes. The multilayer feedthrough capacitor array of the modification example shown in FIG. 7 is different in the shapes of the respective internal electrodes 23, 25, 27, 29 from the multilayer feedthrough capacitor array CA1 of the first embodiment described above.

The second ground internal electrode 29, as shown in FIG. 7 and in (a) in FIG. 8, is formed so that the marginal portion thereof facing the first signal internal electrode 23 is cut off. The first signal internal electrode 23 includes the projection portion 24c extending toward the region formed so as to be cut off in the second ground internal electrode 29. The first ground internal electrode 25, as shown in FIG. 7 and in (b) in FIG. 8, is formed so that the marginal portion thereof facing the second signal internal electrode 27 is cut off. The second signal internal electrode 27 includes the projection portion 28c extending toward the region formed so as to be cut off in the first ground internal electrode 25.

Figure 9:
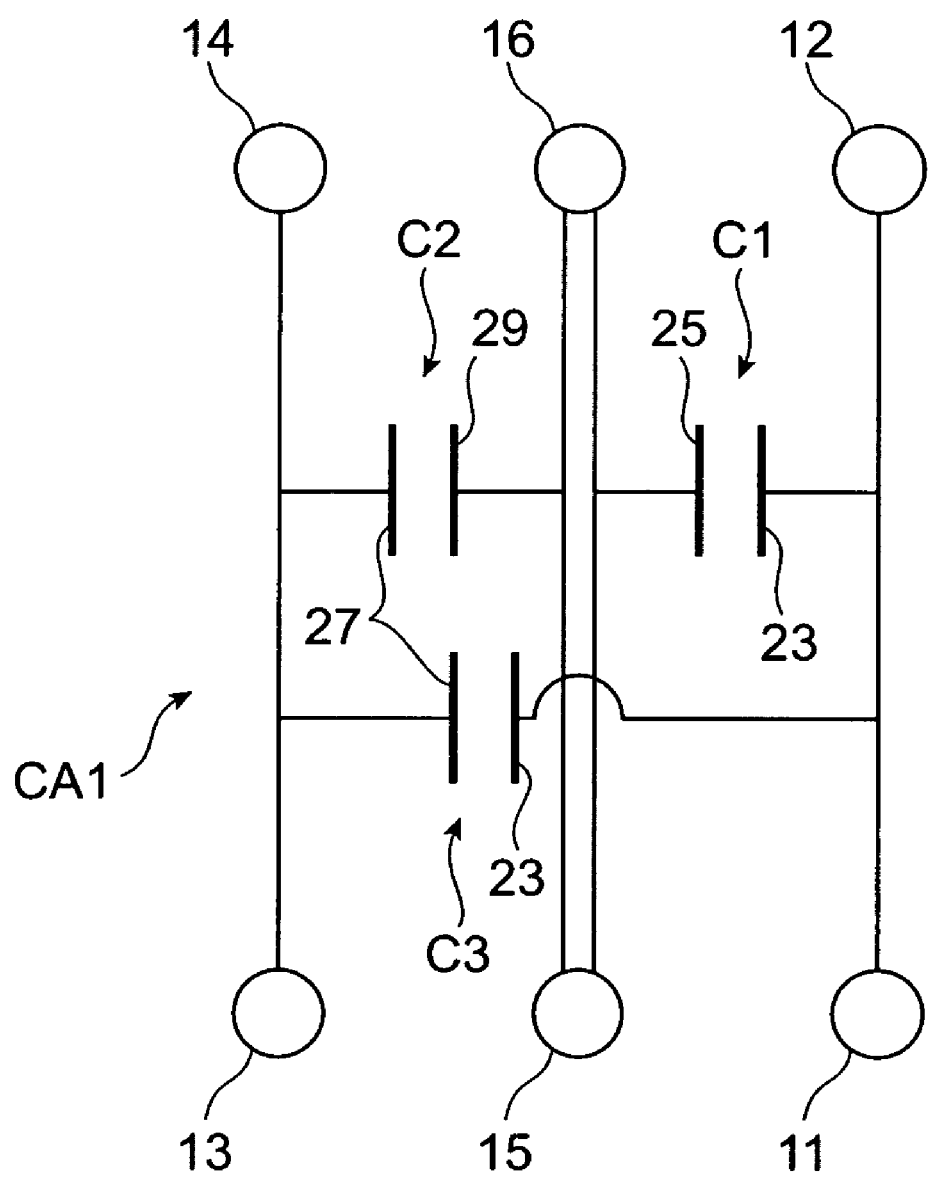
FIG. 9 is an equivalent circuit diagram of the modification example of the multilayer feedthrough capacitor array according to the first embodiment.

The projection 24c of the first signal internal electrode 23 and the projection 28c of the second signal internal electrode 27 face each other with the insulator layer 21 in between. In this configuration, as shown in FIG. 9, a new capacitor C3 (so called a general capacitor) is constructed of the first signal internal electrode 23 and the second signal internal electrode 27. As a result, the multilayer feedthrough capacitor array of the modification example shown in FIG. 7 enables the complex structure of the multilayer feedthrough capacitor array and the general capacitor.

Second Embodiment

Figure 10:
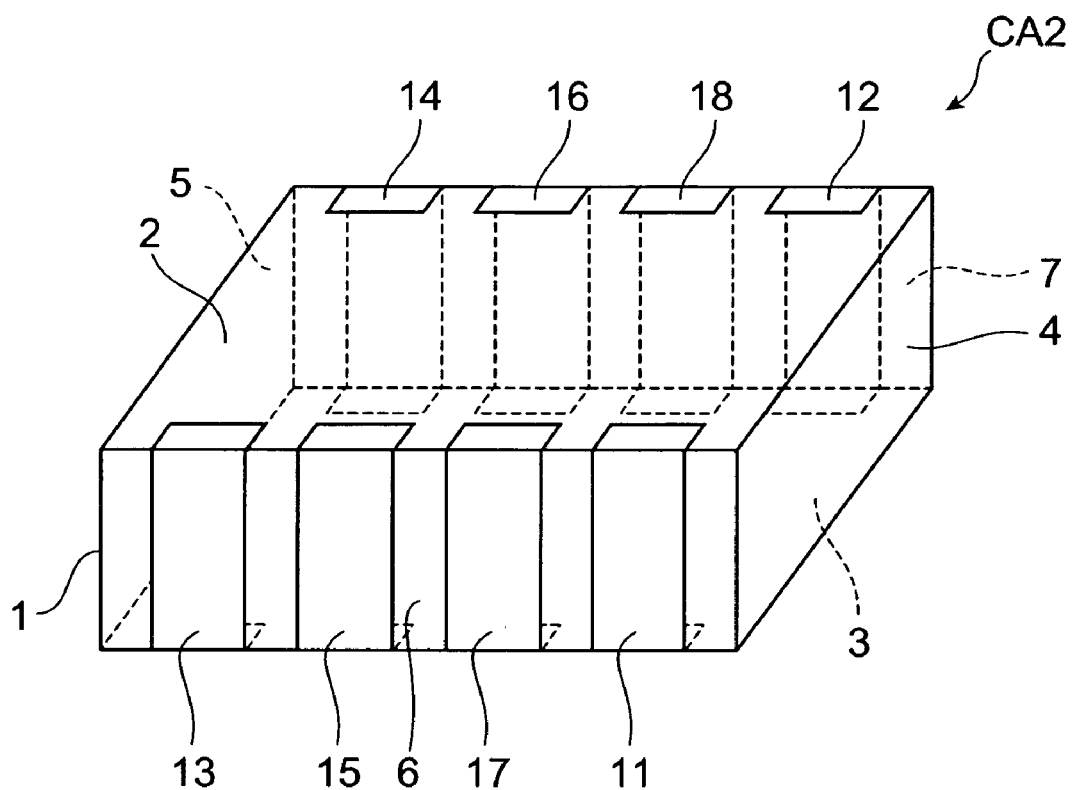
FIG. 10 is a perspective view of a multilayer feedthrough capacitor array according to the second embodiment.
Figure 11:
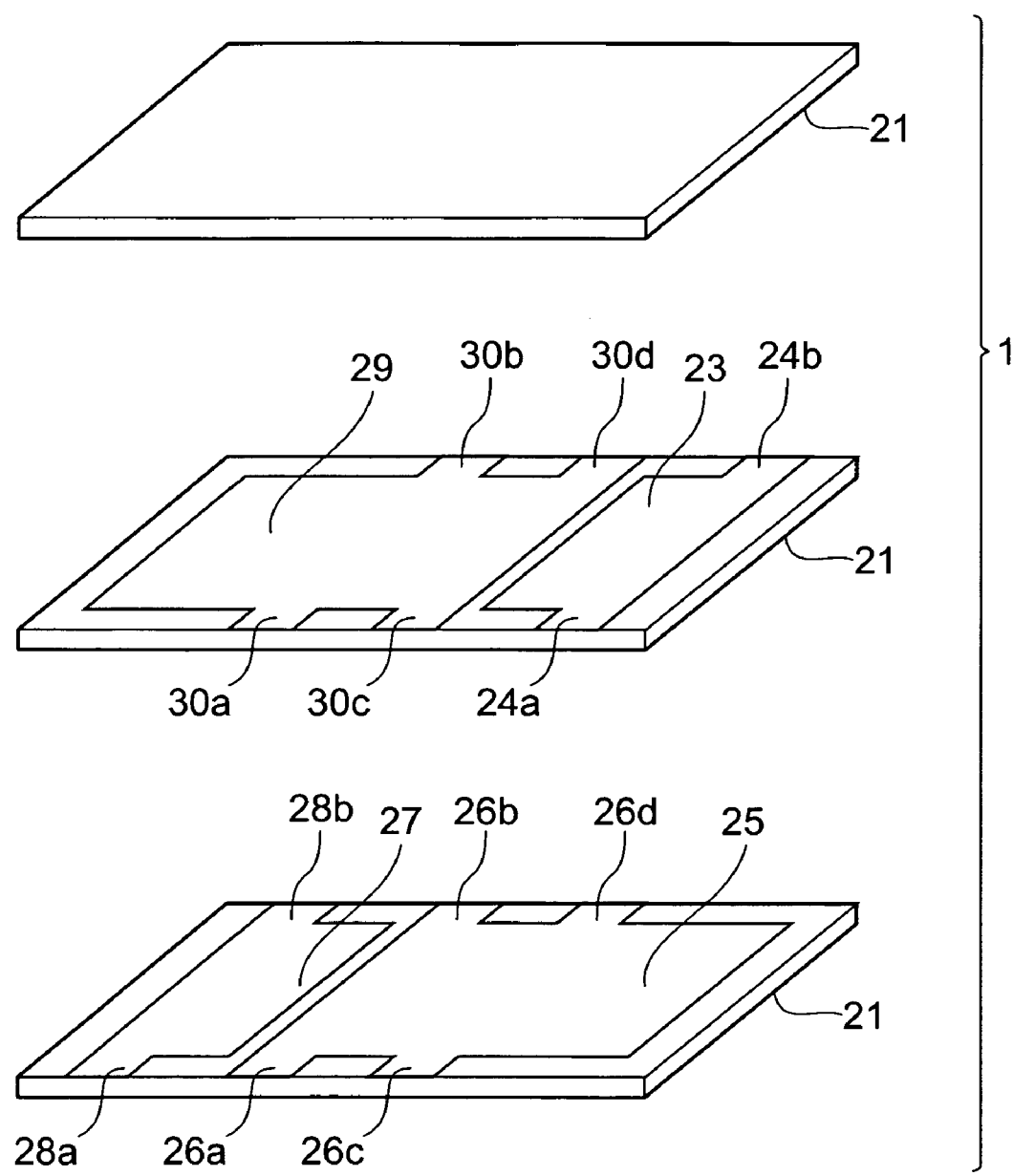
FIG. 11 is an exploded perspective view of a capacitor element in the multilayer feedthrough capacitor array according to the second embodiment.
Figure 12:
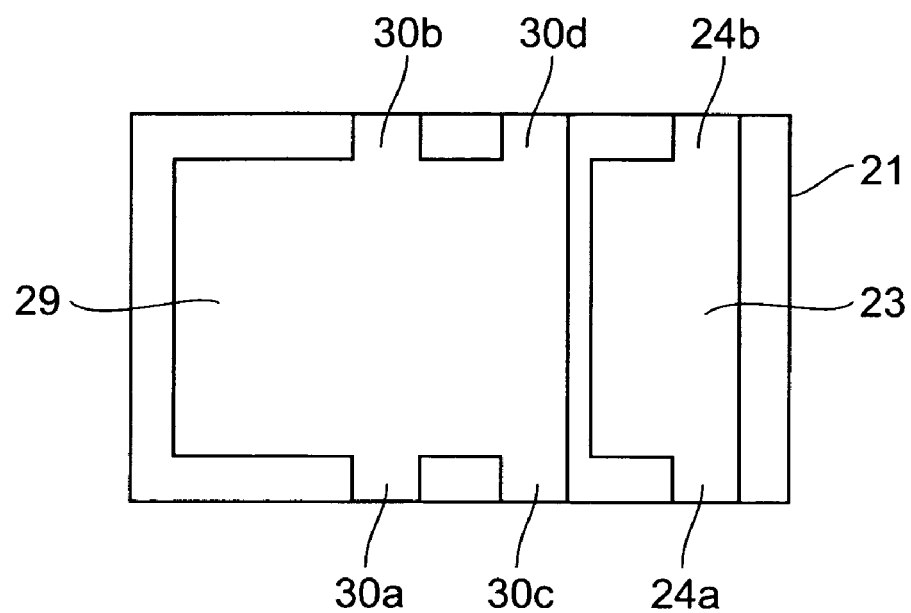
FIG. 12 is schematic views showing shapes of internal electrodes.
Figure 12:
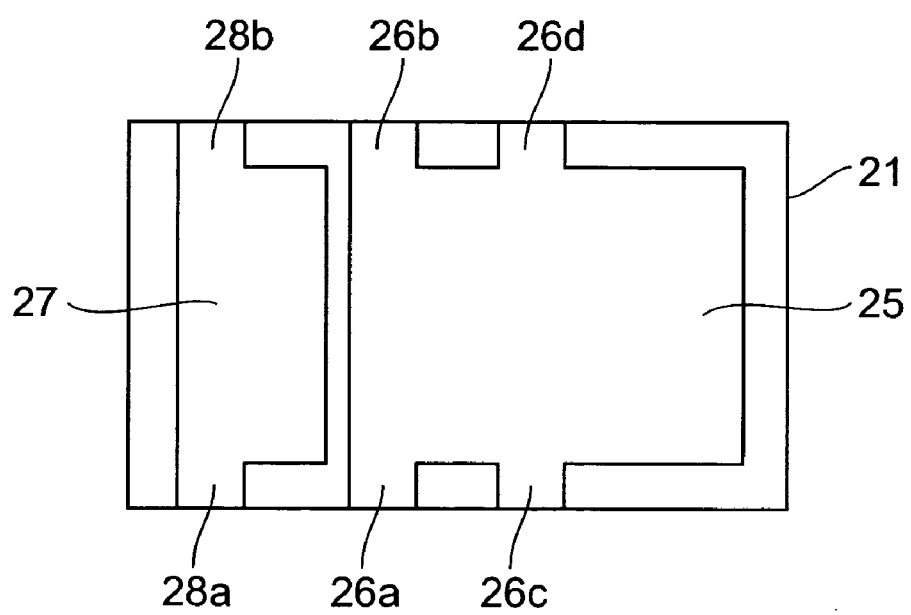

A configuration of a multilayer feedthrough capacitor array CA2 according to the second embodiment will be described with reference to FIGS. 10 to 12. FIG. 10 is a perspective view of the multilayer feedthrough capacitor array according to the second embodiment. FIG. 11 is an exploded perspective view of a capacitor element in the multilayer feedthrough capacitor array according to the second embodiment. FIG. 12 is schematic views showing shapes of internal electrodes.

The multilayer feedthrough capacitor array CA2, as shown in FIG. 10, is provided with a capacitor element 1, and first to eighth terminal electrodes 11-18 disposed on outer surfaces of the capacitor element 1.

The seventh terminal electrode 17 is disposed on a first side surface 6 of the capacitor element 1. The eighth terminal electrode 18 is disposed on a second side surface 7 of the capacitor element 1. The seventh and eighth terminal electrodes 17, 18 function as ground terminal electrodes as the fifth and sixth terminal electrodes 15, 16 do. The seventh and eighth terminal electrodes 17, 18 are formed, for example, by applying an electroconductive paste containing electroconductive metal powder and glass frit, onto the outer surfaces of the capacitor element 1 and baking it, as the first to sixth terminal electrodes 11-16 are. A plated layer is formed on the baked electrodes in certain cases as occasion may demand.

The capacitor element 1 has a plurality of laminated insulator layers 21, a first signal internal electrode 23 and a first ground internal electrode 25, and a second signal internal electrode 27 and a second ground internal electrode 29.

The first ground internal electrode 25, as shown in (b) in FIG. 12, further includes a fifth ground lead portion 26c led to the first side surface 6, and a sixth ground lead portion 26d led to the second side surface 7. The fifth ground lead portion 26c is electrically and physically connected to the seventh terminal electrode 17. The sixth ground lead portion 26d is electrically and physically connected to the eighth terminal electrode 18. These connections result in electrically connecting the first ground internal electrode 25 to the fifth to eighth terminal electrodes 15-18.

The second ground internal electrode 29, as shown in (a) in FIG. 12, further includes a seventh ground lead portion 30c led to the first side surface 6, and an eighth ground lead portion 30d led to the second side surface 7. The seventh ground lead portion 30c is electrically and physically connected to the seventh terminal electrode 17. The eighth ground lead portion 30d is electrically and physically connected to the eighth terminal electrode 18. These connections result in electrically connecting the second ground internal electrode 29 to the fifth to eighth terminal electrodes 15-18. The first ground internal electrode 25 and the second ground internal electrode 29 are electrically connected through the fifth to eighth terminal electrodes 15-18.

In the second embodiment as described above, just as in the case of the aforementioned first embodiment, the first and second ground internal electrodes 25, 27 do not act as a common impedance in the multilayer feedthrough capacitor array CA2, and thus no common impedance coupling occurs between the capacitor constructed of the first signal internal electrode 23 and the first ground internal electrode 25 and the capacitor constructed of the second signal internal electrode 27 and the second ground internal electrode 29. As a result, it is feasible to suppress the occurrence of crosstalk between the aforementioned capacitors.

Incidentally, the impedance of the fifth to eighth terminal electrodes 15-18 is much smaller than that of the first and second ground internal electrodes 25, 29. Therefore, the possibility of occurrence of the common impedance coupling is extremely low even if the first ground internal electrode 25 and the second ground internal electrode 29 are electrically connected through the fifth to eighth terminal electrodes 15-18.

Figure 13:
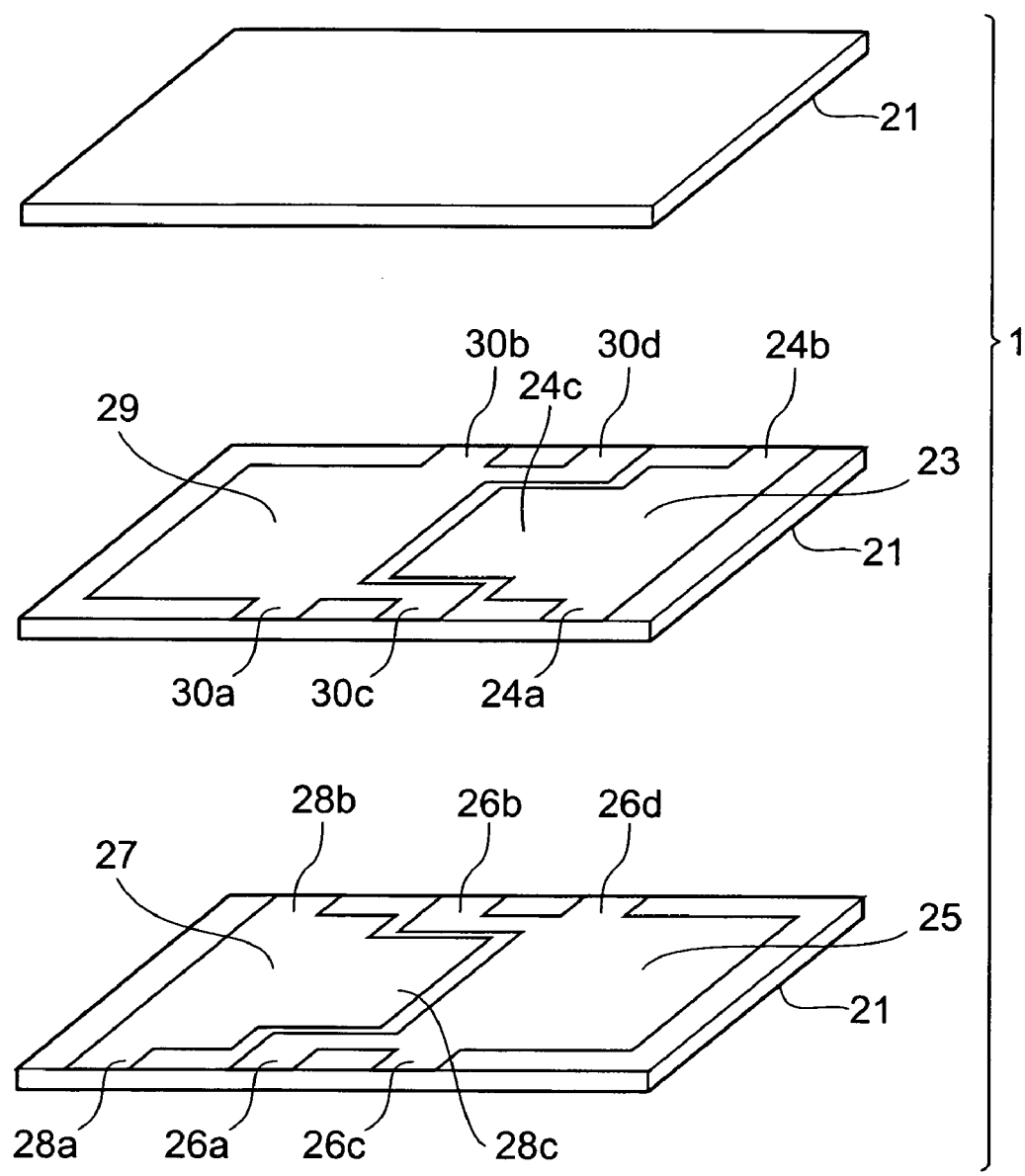
FIG. 13 is an exploded perspective view of a capacitor element in a modification example of the multilayer feedthrough capacitor array according to the second embodiment.
Figure 14:
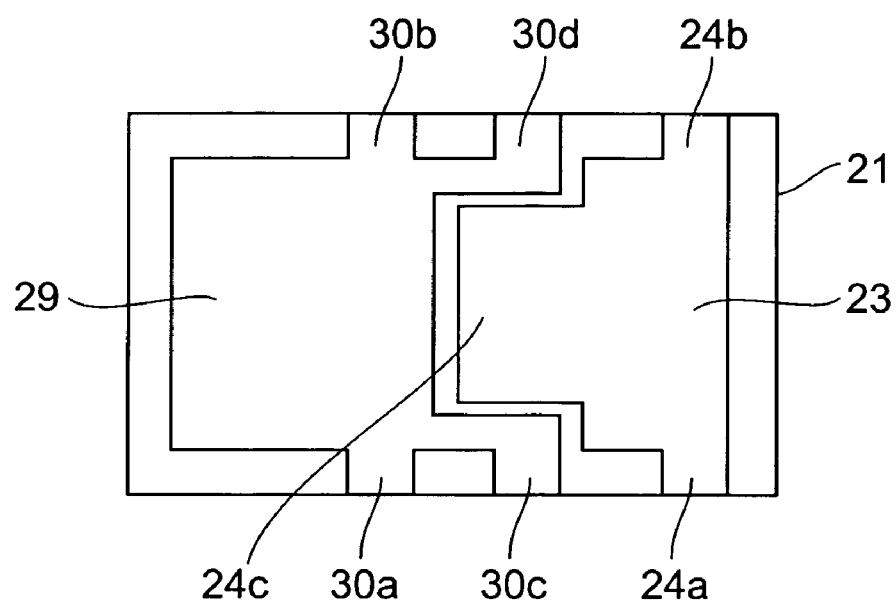
FIG. 14 is schematic views showing shapes of internal electrodes.
Figure 14:
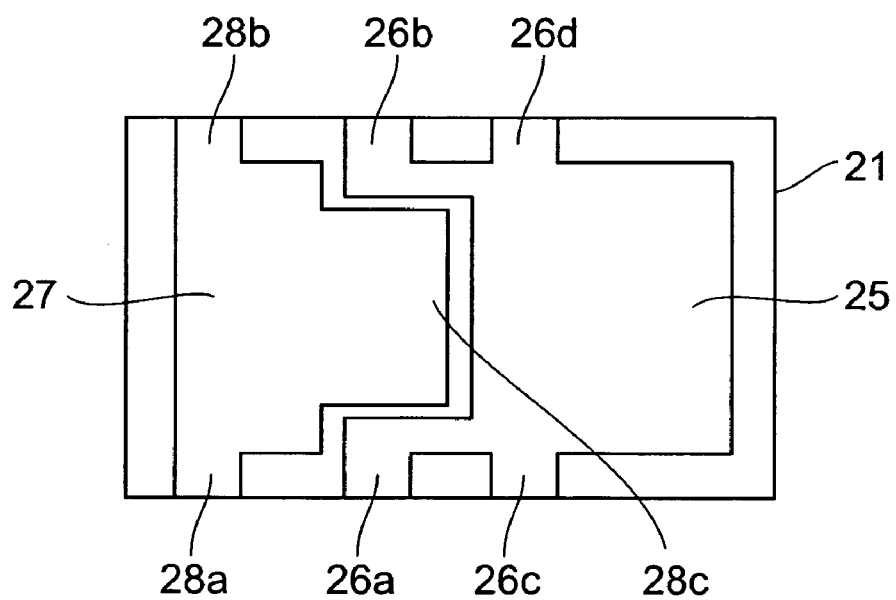

A configuration of a modification example of the multilayer feedthrough capacitor array CA2 according to the second embodiment will be described below with reference to FIGS. 13 and 14. FIG. 13 is an exploded perspective view of the capacitor element in the modification example of the multilayer feedthrough capacitor array according to the second embodiment. FIG. 14 is schematic views showing shapes of internal electrodes. The multilayer feedthrough capacitor array of the modification example shown in FIG. 13 is different in the shapes of the respective internal electrodes 23, 25, 27, 29 from the multilayer feedthrough capacitor array CA2 of the second embodiment described above.

The second ground internal electrode 29, as shown in FIG. 13 and in (a) in FIG. 14, is formed so that the marginal portion thereof facing the first signal internal electrode 23 is cut off. The first signal internal electrode 23 includes the projection portion 24c extending toward the region formed so as to be cut off in the second ground internal electrode 29. The first ground internal electrode 25, as shown in FIG. 13 and in (b) in FIG. 14, is formed so that the marginal portion thereof facing the second signal internal electrode 27 is cut off. The second signal internal electrode 27 includes the projection portion 28c extending toward the region formed so as to be cut off in the first ground internal electrode 25. For these reasons, the area of the first signal internal electrode 23 and the second signal internal electrode 27 can be set to a relatively large value, and it can increase the capacitance of the capacitor constructed of the first signal internal electrode 23 and the first ground internal electrode 25 and the capacitance of the capacitor constructed of the second signal internal electrode 27 and the second ground internal electrode 29.

Figure 15:
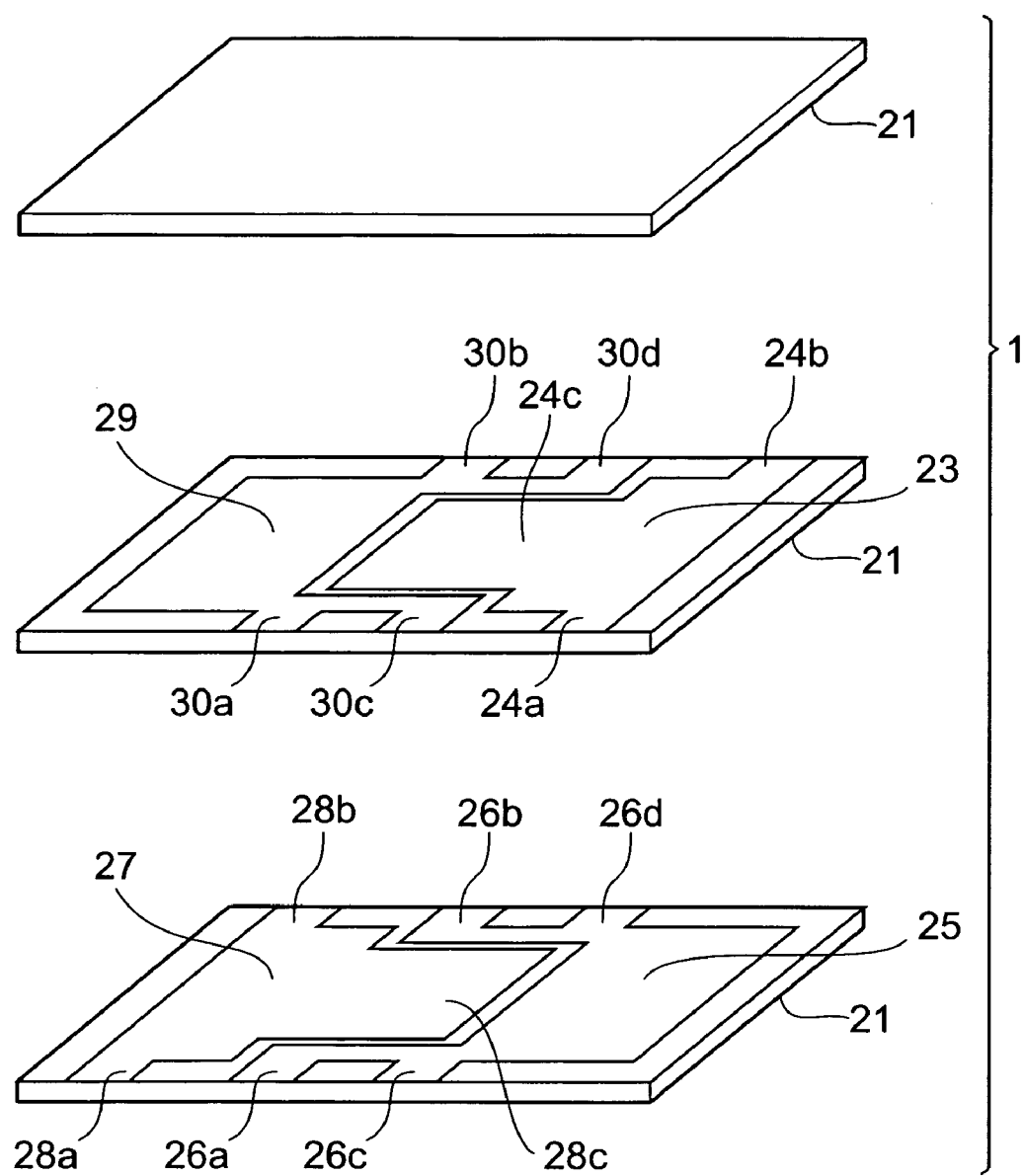
FIG. 15 is an exploded perspective view of a capacitor element in another modification example of the multilayer feedthrough capacitor array according to the second embodiment.
Figure 16:
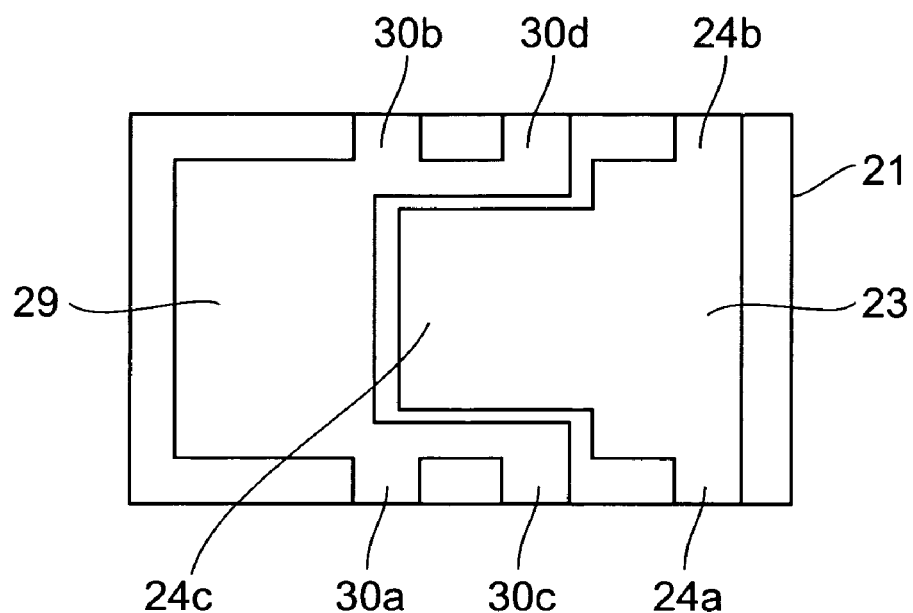
FIG. 16 is schematic views showing shapes of internal electrodes.
Figure 16:
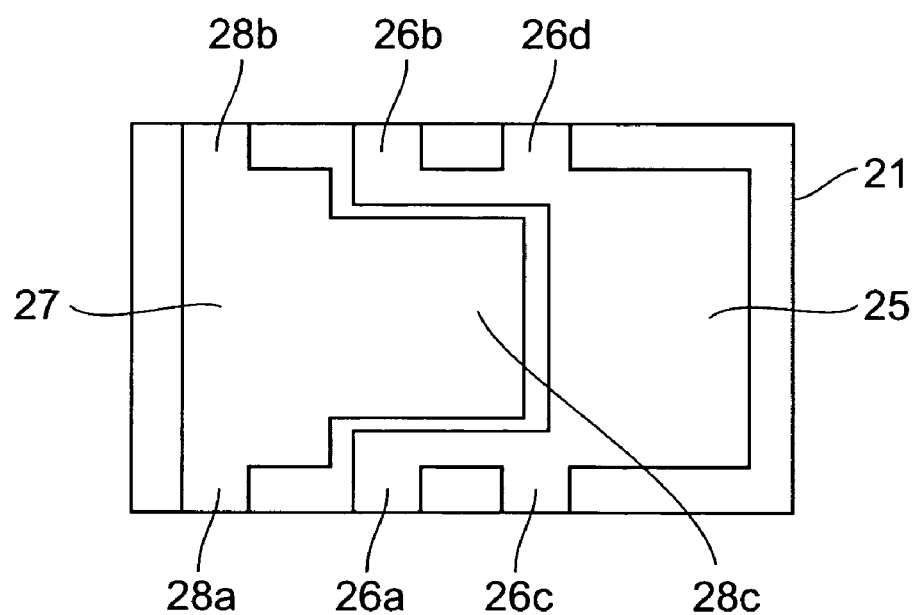

A configuration of a further modification example of the multilayer feedthrough capacitor array CA2 will be described below with reference to FIGS. 15 and 16. FIG. 15 is an exploded perspective view of the capacitor element in the modification example of the multilayer feedthrough capacitor array according to the second embodiment. FIG. 16 is schematic views showing shapes of internal electrodes. The multilayer feedthrough capacitor array of the modification example shown in FIG. 15 is different in the shapes of the respective internal electrodes 23, 25, 27, 29 from the multilayer feedthrough capacitor array CA2 of the second embodiment described above.

The second ground internal electrode 29, as shown in FIG. 15 and in (a) in FIG. 16, is formed so that the marginal portion thereof facing the first signal internal electrode 23 is cut off. The first signal internal electrode 23 includes the projection portion 24c extending toward the region formed so as to be cut off in the second ground internal electrode 29. The first ground internal electrode 25, as shown in FIG. 15 and in (b) in FIG. 16, is formed so that the marginal portion thereof facing the second signal internal electrode 27 is cut off. The second signal internal electrode 27 includes the projection portion 28c extending toward the region formed so as to be cut off in the first ground internal electrode 25.

The projection 24c of the first signal internal electrode 23 and the projection 28c of the second signal internal electrode 27 face each other with the insulator layer 21 in between. In this configuration, a new capacitor (so called a general capacitor) is constructed of the first signal internal electrode 23 and the second signal internal electrode 27. As a result, the multilayer feedthrough capacitor array of the modification example shown in FIG. 15 enables the complex structure of the multilayer feedthrough capacitor array and the general capacitor.

The above described the preferred embodiments of the present invention, but it is noted that the present invention is by no means limited to the above-described embodiments and that the present invention can be modified in various ways without departing from the spirit and scope of the invention.

The above-described embodiments adopted the configuration wherein the first signal internal electrode 23 and the second ground internal electrode 29 were disposed in the same plane and wherein the second signal internal electrode 27 and the first ground internal electrode 25 were disposed in the same plane, but the invention is not limited to this configuration. For example, the first signal internal electrode 23 and the second ground internal electrode 29 may be disposed on different planes, i.e., at different positions in the laminate direction of the insulator layers 21. Likewise, the second signal internal electrode 27 and the first ground internal electrode 25 may also be disposed on different planes, i.e., at different positions in the laminate direction of the insulator layers 21.

The laminate number of insulator layers 21 and the number of layers where the internal electrodes 23, 25, 27, 29 are disposed are not limited to the numbers described in the above-described embodiments.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer feedthrough capacitor array comprising a capacitor element, and first to sixth terminal electrodes disposed on outer surfaces of the capacitor element,
wherein the capacitor element has a plurality of laminated insulator layers, a first signal internal electrode and a first ground internal electrode disposed so as to face each other with at least one of the insulator layer in between, and a second signal internal electrode and a second ground internal electrode disposed so as to face each other with at least one of the insulator layer in between,
wherein the first signal internal electrode comprises first and second signal lead portions led to the outer surfaces, and the first and second signal lead portions are electrically connected to the first and second terminal electrodes, respectively,
wherein the first ground internal electrode comprises first and second ground lead portions led to the outer surfaces, and the first and second ground lead portions are electrically connected to the fifth and sixth terminal electrodes, respectively,
wherein the second signal internal electrode comprises third and fourth signal lead portions led to the outer surfaces, and the third and fourth signal lead portions are electrically connected to the third and fourth terminal electrodes, respectively,
wherein the second ground internal electrode comprises third and fourth ground lead portions led to the outer surfaces, and the third and fourth ground lead portions are electrically connected to the fifth and sixth terminal electrodes, respectively, and
wherein the first signal internal electrode and the second ground internal electrode are disposed so as not to face each other with the insulator layer in between, and the second signal internal electrode and the first ground internal electrode are disposed so as not to face each other with the insulator layer in between.

2. The multilayer feedthrough capacitor array according to claim 1,
wherein the first signal internal electrode and the second ground internal electrode are disposed in one plane.

3. The multilayer feedthrough capacitor array according to claim 2,
wherein the second ground internal electrode is formed so that a marginal portion thereof facing the first signal internal electrode is cut off, and
wherein the first signal internal electrode comprises a projection portion extending toward a region formed so as to be cut off in the second ground internal electrode.

4. The multilayer feedthrough capacitor array according to claim 1,
wherein the second signal internal electrode and the first ground internal electrode are disposed in one plane.

5. The multilayer feedthrough capacitor array according to claim 4,
wherein the first ground internal electrode is formed so that a marginal portion thereof facing the second signal internal electrode is cut off, and
wherein the second signal internal electrode comprises a projection portion extending toward a region formed so as to be cut off in the first ground internal electrode.

6. The multilayer feedthrough capacitor array according to claim 1,
wherein the first signal internal electrode and the second signal internal electrode comprise respective portions facing each other with at least one of the insulator layer in between.

7. The multilayer feedthrough capacitor array according to claim 1,
further comprising seventh and eighth terminal electrodes,
wherein the first ground internal electrode further comprises fifth and sixth ground lead portions led to the outer surfaces, and the fifth and sixth ground lead portions are electrically connected to the seventh and eighth terminal electrodes, respectively, and
wherein the second ground internal electrode comprises seventh and eighth ground lead portions led to the outer surfaces, and the seventh and eighth ground lead portions are electrically connected to the seventh and eighth terminal electrodes, respectively.

8. The multilayer feedthrough capacitor array according to claim 1,
wherein the first signal internal electrode and the second ground internal electrode are disposed in one plane, and
wherein the second signal internal electrode and the first ground internal electrode are formed in one plane.

9. The multilayer feedthrough capacitor array according to claim 8,
wherein the second ground internal electrode is formed so that a marginal portion thereof facing the first signal internal electrode is cut off,
wherein the first signal internal electrode comprises a projection portion extending toward a region formed so as to be cut off in the second ground internal electrode,
wherein the first ground internal electrode is formed so that a marginal portion thereof facing the second signal internal electrode is cut off, and
wherein the second signal internal electrode comprises a projection portion extending toward a region formed so as to be cut off in the first ground internal electrode.

10. A multilayer feedthrough capacitor array comprising a capacitor element, and first to sixth terminal electrodes disposed on outer surfaces of the capacitor element,
wherein the capacitor element has a plurality of laminated insulator layers, a first signal internal electrode and a first ground internal electrode disposed so as to face each other with at least one of the insulator layer in between, and a second signal internal electrode and a second ground internal electrode disposed so as to face each other with at least one of the insulator layer in between,
wherein the first signal internal electrode comprises a first signal lead portion electrically and physically connected to the first terminal electrode, and a second signal lead portion electrically and physically connected to the second terminal electrode,
wherein the first ground internal electrode comprises a first ground lead portion electrically and physically connected to the fifth terminal electrode, and a second ground lead portion electrically and physically connected to the sixth terminal electrode,
wherein the second signal internal electrode comprises a third signal lead portion electrically and physically connected to the third terminal electrode, and a fourth signal lead portion electrically and physically connected to the fourth terminal electrode, wherein the second ground internal electrode comprises a third ground lead portion electrically and physically connected to the fifth terminal electrode, and a fourth ground lead portion electrically and physically connected to the sixth terminal electrode, and wherein the first signal internal electrode and the second ground internal electrode are disposed so as not to face each other with the insulator layer in between, and the second signal internal electrode and the first ground internal electrode are disposed so as not to face each other with the insulator layer in between.

11. The multilayer feedthrough capacitor array according to claim 10, wherein the first signal internal electrode and the second ground internal electrode are disposed in one plane.

12. The multilayer feedthrough capacitor array according to claim 11, wherein the second ground internal electrode is formed so that a marginal portion thereof facing the first signal internal electrode is cut off, and wherein the first signal internal electrode comprises a projection portion extending toward a region formed so as to be cut off in the second ground internal electrode.

13. The multilayer feedthrough capacitor array according to claim 10, wherein the second signal internal electrode and the first ground internal electrode are disposed in one plane.

14. The multilayer feedthrough capacitor array according to claim 13, wherein the first ground internal electrode is formed so that a marginal portion thereof facing the second signal internal electrode is cut off, and wherein the second signal internal electrode comprises a projection portion extending toward a region formed so as to be cut off in the first ground internal electrode.

15. The multilayer feedthrough capacitor array according to claim 10, wherein the first signal internal electrode and the second signal internal electrode comprise respective portions facing each other with at least one of the insulator layer in between.

16. The multilayer feedthrough capacitor array according to claim 10, further comprising seventh and eighth terminal electrodes, wherein the first ground internal electrode comprises a fifth ground lead portion electrically and physically connected to the seventh terminal electrode, and a sixth ground lead portion electrically and physically connected to the eighth terminal electrode, and wherein the second ground internal electrode comprises a seventh ground lead portion electrically and physically connected to the seventh terminal electrode, and an eighth ground lead portion electrically and physically connected to the eighth terminal electrode.

17. The multilayer feedthrough capacitor array according to claim 10, wherein the first signal internal electrode and the second ground internal electrode are disposed in one plane, and wherein the second signal internal electrode and the first ground internal electrode are formed in one plane.

18. The multilayer feedthrough capacitor array according to claim 17, wherein the second ground internal electrode is formed so that a marginal portion thereof facing the first signal internal electrode is cut off, wherein the first signal internal electrode comprises a projection portion extending toward a region formed so as to be cut off in the second ground internal electrode, wherein the first ground internal electrode is formed so that a marginal portion thereof facing the second signal internal electrode is cut off, and wherein the second signal internal electrode comprises a projection portion extending toward a region formed so as to be cut off in the first ground internal electrode.

* * * * *